INVENTOR.
J. R. KIDD
BY Young & Quigg
ATTORNEYS

United States Patent Office 3,523,759
Patented Aug. 11, 1970

3,523,759
APPARATUS FOR PRODUCING CARBON BLACK
Jesse R. Kidd, Orange, Tex., assignor to Phillips Petroleum Company, a corporation of Delaware
Filed Oct. 16, 1967, Ser. No. 675,392
Int. Cl. C09c 1/48, 1/50; C10b 47/04
U.S. Cl. 23—259.5                             6 Claims

ABSTRACT OF THE DISCLOSURE

A carbon black producing apparatus having three axially aligned combustion chambers suitable for producing high structure carbon black is equipped with a removable annular plug in the upstream chamber to yield two axially aligned combustion chambers suitable for producing regular and low structure carbon blacks.

---

This invention relates to the production of carbon black. In another aspect, this invention relates to an improved apparatus adapted to produce high, regular, and low structure carbon blacks.

The grade of a carbon black depends to a large extent upon the particular process by which it is produced. Carbon blacks are normally graded or classified on the basis of structure, which means characteristics of carbon black relating to the flocculation of the particles. While the classifications of structure in carbon black are relative, the commercial carbon blacks can be classified generally as high structure, normal structure, or regular structure, and low structure. Therefore, when the structure is said to be low there is little tendency for the particles to form chains of particles and when the structure is said to be high, there is a strong tendency for the particles to form such chains. It is well known that there are different commercial applications for all structures, i.e., high, regular and low.

As stated above, the structure of carbon blacks to a large extent depends upon the particular process by which they are produced. One such process is disclosed in U.S. Pat. 2,564,700 (1951). This process will produce both low and regular structure carbon black.

Recently, a furnace-type process has been developed which involves the use of three axially aligned reaction zones and yields carbon blacks of high structural characteristics. This improved process generally comprises introducing a first stream of a free oxygen-containing gas into the upstream end of a generally cylindrical first zone having a length greater than its diameter; introducing a stream of a hydrocarbon feedstock into said first zone and into said free oxygen-containing gas therein at a point downstream from the point of introduction of said free oxygen-containing gas and upstream from the downstream end of said first zone; passing the resulting admixture from said first zone into a generally cylindrical second zone having a diameter greater than its length and greater than the diameter of said first zone, the upstream end of said second zone being in open communication with and axially aligned with the downstream end of said first zone; introducing a second stream of gas comprising a free oxygen-containing gas into said second zone to establish a mass of gas surrounding said admixture introduced from said first zone; passing said admixture from said second zone surrounded by said mass of gas into a generally cylindrical third zone having a length greater than its diameter and a diameter less than the diameter of said second zone; forming said carbon black product from said feedstock by decomposition of same under carbon black producing conditions in said first, second, and third zones; and separating said carbon black from the gaseous effluent from said third zone.

Preferably, the first stream of free oxygen-containing gas is introduced longitudinally into the upstream end of said first zone and the second stream of free oxygen-containing gas is introduced tangentially into the second zone to establish a rotating mass of gas in said second zone. The stream of feedstock is introduced into the first zone and into the first stream of free oxygen-containing gas at a point downstream from the point of introduction of the first stream of free oxygen-containing gas and upstream from the upstream end of the second zone. The resulting admixture from the first zone is then passed axially through the second zone, and axially into the third zone while surrounded by the rotating mass of gas from the second zone.

In one embodiment of this process, a stream of a fuel is introduced into admixture with the stream of air in the first zone at a point upstream from the point of introduction of the hydrocarbon feedstock. In still another embodiment, the introduction of this fuel into the first zone is omitted and the first stream of free oxygen-containing gas which is introduced into the second zone comprises a stream of hot combustion gases resulting from the substantially complete combustion of a combustible mixture of a fuel with an excess of air introduced into a tunnel combustion zone communicating with the second zone. Preferably, the tunnel combustion zone communicates tangentially with the second zone.

Generally speaking, as the amount of the axially introduced free oxygen-containing gas of the first stream is increased, the structure characteristics of the carbon black product also increases, i.e., there is obtained a carbon black product having a high structure.

Also, in this process, the point of introduction of the hydrocarbon feedstock into the first reaction zone has a definite effect on the structure characteristics of the carbon black product. Generally, as the point of introduction of this feedstock into said first reaction zone is moved upstream from the entrance of said second reaction chamber, there is obtained an increase in the structure characteristics of the carbon black product.

From the above discussion, it is readily apparent that when it was heretofore desired to manufacture both high and regular structure carbon black, it was also necessary to have different carbon black producing devices. Therefore, there is needed an apparatus that will not only produce high structure carbon blacks in a manner described above, but also regular structure carbon blacks in a manner as disclosed in U.S. Pat. 2,564,700.

Therefore, one object of this invention is to provide an improved apparatus for making carbon black.

Another object of this invention is to provide an improved carbon black producing apparatus which is adjustable to produce low, regular, and high structure carbon blacks.

Another object of this invention is to provide a method of converting a high structure carbon black producing apparatus to an apparatus suitable for producing low and regular structure carbon blacks.

According to one embodiment of the invention, there is provided an improved carbon black furnace that is readily convertible internally from two to three or three to two axially aligned reaction zones. Generally, a high structure carbon black producing furnace containing first, second, and third axially aligned cylindrical reaction chambers is provided with a removable annular plug adapted to constrict the outlet end of the first cylindrical reaction chamber, and a means to inject feedstock through the opening in said annular plug axially into the second cylindrical reaction chamber. Thus, when the annular plug is positioned in the first cylindrical reaction chamber, the three-chambered furnace constructed to produce carbon black having high structure characteristics is converted to a two-chambered furnace having an internal configuration similar to the furnace disclosed in U.S. Pat. 2,564,700.

In a preferred embodiment of this invention, the annular plug is a composite three-membered interlocking plug which fills the first cylindrical reaction chamber and a feedstock conduit is positioned therethrough so that its outlet is substantially flush with the outlet of the first cylindrical reaction chamber.

This invention will be understood more easily from the study of the drawings in which.

Figure 1:
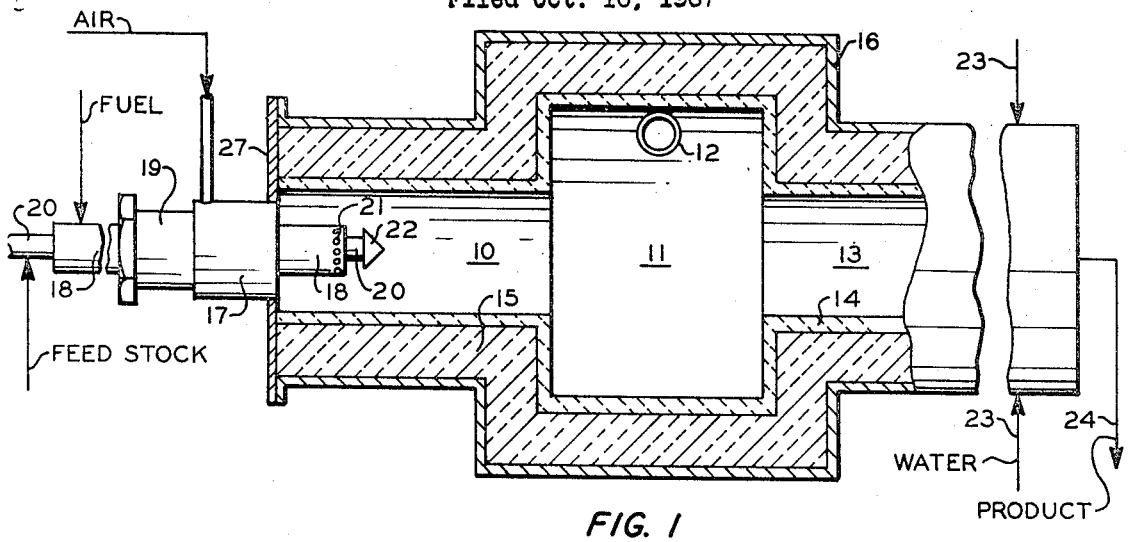
FIG. 1 is a cross-sectional view of a high structure producing carbon black furnace.

New referring to FIG. 1, there is illustrated a cross-sectional view of a high structure producing carbon black furnace. Reaction chamber 10 is a cylindrical chamber, preferably having a length greater than its width. Reaction chamber 11 is a cylindrical reaction chamber having a diameter which is preferably greater than its length and greater than the diameter of reaction chamber 10. Reaction chamber 10 is in axial alignment with reaction chamber 11 and is connected at the downstream end to the upstream end of reaction chamber 11. At least one inlet tunnel 12 communicates with reaction chamber 11. In the embodiment described herein inlet tunnel 12 communicates tangentially with reaction chamber 11. Reaction chamber 13 is a cylindrical chamber having a length which is preferably greater than its diameter and a diameter less than the diameter of reaction chamber 11. Reaction chamber 13 is in axial alignment with reaction chamber 11 and is connected at its upstream end to the downstream end of reaction chamber 11. Each reaction chamber is lined with a refractory lining 14 made of a material such as sillimanite, alumina, or other refractory materials suitable for the purpose. A layer of insulating material 15 is positioned between refractory lining 14 and steel shell 16.

Air conduit 17 communicates with the inlet end of reaction chamber 10. Fuel conduit 18 is positioned within stationary air conduit 17 and slidably mounted through packing gland 19, which is securely positioned within air conduit 17. Feedstock conduit 20 is positioned longitudinally within fuel conduit 18, and fuel conduit 18 is sealed around feedstock 20 adjacent its inlet and outlet end. If desired, feedstock conduit 20 can be movable in relation to fuel conduit 18; however, as shown in FIG. 1, feedstock conduit 20 is tightly sealed within fuel conduit 18. Openings 21 are carried adjacent the outlet end of conduit 18 for introducing fuel such as natural gas into a longitudinally flowing stream of air from conduit 17. Nozzle 22 is positioned on the outlet end of conduit 20 for spraying carbon black feedstock into a longitudinal flowing mixture of air and fuel from conduits 17 and 18 respectively. It is readily seen that the oulets of conduits 18 and 20 can be positioned at any longitudinal point within cylindrical reaction chamber 10 by sliding conduit 18 through packing gland 19 to produce carbon black having the desired structure characteristics which are in general, much higher than the structure characteristics of the carbon black produced by the apparatus of FIG. 2 which will be described below.

In the operation of one embodiment of this invention, a combustible mixture of a fuel and air, for example, is introduced into inlet tunnel 12 which communicates tangentially with reaction chamber 11. Normally the combustible mixture from inlet tunnel 12 is substantially burned within tunnel 12, and as more combustible material is injected into tunnel 12, a combustible mixture (flame and combustion products) will exit therefrom and enter reaction chamber 11 and follow a spiral path around the same toward the axis thereof. A mixture of fuel, air, and reactant from the first cylindrical reaction chamber 10, is passed axially through reaction chamber 11 and enters reaction chamber 13 surrounded by the hot combustion gases from reaction chamber 11. Carbon black formation is concluded in reaction chamber 13, and a suitable means such as water sprays 23 are used to cool the hot combustion gases adjacent the outlet of reaction chamber 13 to a temperature below that at which carbon black is produced. The cooled product is then removed via conduit 24. The above apparatus will generally produce carbon black of high structure characteristics, and FIG. 2 illustrates the modified apparatus for producing low and regular structure carbon blacks.

Figure 2:
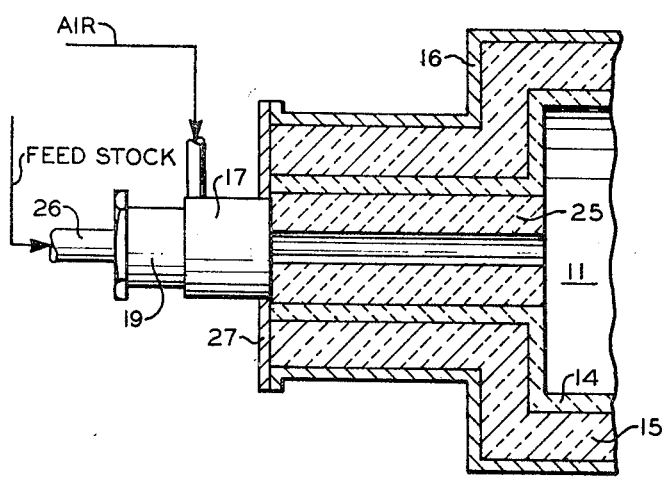
FIG. 2 is a cross section of the furnace of FIG. 1 which is adapted to produce low and regular structure carbon blacks.

As illustrated in FIG. 2, annular plug 25 is positioned longitudinally within reaction chamber 10 and feedstock introduction conduit 26 is positioned through packing gland 19 and the opening of annular plug 25 so that its outlet is substantially flush with the outlet of reaction chamber 10. Feedstock introduction conduit 26 can be any suitable conduit means such as a conduit having a nozzle or constriction adjacent its outlet end for introducing a carbon black feedstock such as hydrocarbon oil axially into reaction chamber 11.

Annular plug 25 can be easily inserted into and removed from reaction chamber 10 after removing back plate 27 from the inlet of the reaction chamber 10. When annular plug 25 is so inserted within reaction chamber 10, the furnace can operate similar to the furnace disclosed in U.S. Pat. 2,564,700. During this operation, a small amount of "jacket air" is supplied to conduit 17 and passed into reaction chamber 11 from the annular opening between feedstock conduit 26 and plug 25. This operation will result in carbon black products having low and regular structure characteristics.

Figure 3:
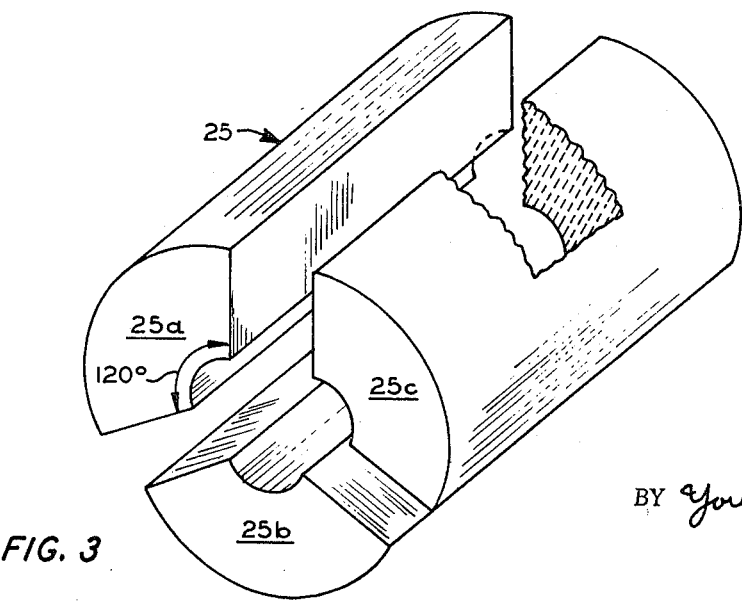
FIG. 3 is an exploded perspective view of a preferred embodiment of this invention.

FIG. 3 is an exploded perspective view of a preferred annular plug of this invention. As illustrated, plug 25 comprises three elongated segments, 25a, 25b, and 25c, each cut at a 120° angle so that when the plug is assembled and placed within the reaction chamber 10 the segments will be held by the inside periphery of chamber 10 in a locking relationship therein to form a chamber of reduced diameter. If desired, a thin layer of mortar or suitable suitable sealant can be placed between the plug sections and around the outer periphery of the composite plug; however, the use of this mortar or sealant is not required to effectively seal off reaction chamber 11. It is preferred that plug 25 be made of ceramic material similar to lining 14, but any suitable material can be used.

It must be noted that this invention is not intended to be restricted to the particular embodiment disclosed above. For example, any type annular plug having an outside diameter slightly smaller than the inside diameter of the first cylindrical reaction chamber and an inside diameter slightly larger than the diameter of feedstock introduction conduit 26 and adapted to fit adjacent the outlet end of cylindrical reaction chamber 10 can be used with this invention. Such plug can be one-piece or two- or-more-piece composite type structure.

The following example will serve to further illustrate this invention.

EXAMPLE

Test runs 2 through 6 below were conducted in a 3-chambered furnace similar to the furnace illustrated in FIG. 1 wherein the annular plug 25 was not positioned at the outlet of the first cylindrical reaction zone 10. In the reactor employed, the first cylindrical reaction zone 10 was twelve inches in diameter and 45 inches in length. The second cylindrical reaction zone 11 was 37 inches in diameter and 12 inches in length. The third cylindrical reaction zone was 12 inches in diameter.

The reaction zones used for the process of run 11 have the configuration as illustrated in FIG. 2 wherein annular plug 25 is positioned at the outlet of the first cylindrical reaction zone 10. Thus, cylindrical reaction zone 11 had a diameter of 37 inches and a length of 12 inches, and cylindrical reaction zone 13 was 12 inches in diameter.

The feedstock used was a conventional commercial aromatic concentrate feedstock prepared by liquid sulfur dioxide extraction of cycle oils obtained in the catalytic cracking of gas-oils. The feedstock had a BMCI value of 91. Typical properties of this feedstock are set forth in Table I below:

TABLE I
Oil feedstocks

| | |
|---|---|
| Gravity, °API | 11.4 |
| ASTM Vac. Dist. °F. @ 760 mm. Hg (percent condensed): | |
| 2 | 539 |
| 5 | 564 |
| 10 | 586 |
| 20 | 606 |
| 30 | 624 |
| 40 | 539 |
| 50 | 657 |
| 60 | 671 |
| 70 | 691 |
| 80 | 715 |
| 90 | 749 |
| 95 | 784 |
| BMCI [1] | 91 |
| Carbon, wt. percent | 89.0 |
| Hydrogen, wt. percent | 9.3 |

[1] Bureau of Mines Correlation Index.

The following series of runs illustrate the effect of positioning annular plug 25 at the outlet of first cylindrical reaction zone 10. The runs also illustrate the effect of changing the position of the point of introduction of the oil feedstock into the first cylindrical reaction zone 10. Operating conditions, yields of carbon black, and tests on the carbon black products are set forth in Table II below.

Run 1 illustrates the effect of operating the furnace as illustrated in FIG. 2 wherein the annular disk is positioned at the outlet of the first cylindrical reaction zone 10 to yield an internal furnace configuration of the two axially aligned cylindrical reaction zones as illustrated. Runs 2–6 illustrate the effect on the carbon black product when thed istance between the oil feedstock discharge nozzle 24 and the entrance to the second cylindrical combustion zone 12 was incrementally increased.

TABLE II

| | Run No. | | | | | |
|---|---|---|---|---|---|---|
| | 1 | 2 | 3 | 4 | 5 | 6 |
| Oil charge: | | | | | | |
| Rate, gal./hr | 248 | 169 | 169 | 169 | 169 | 169 |
| Preheat, °F | 550 | 550 | 550 | 550 | 550 | 550 |
| Nozzle location, inches [1] | 0 | 6 | 8 | 10 | 12 | 19 |
| Spray pressure | | 120 | 120 | 120 | 52 | 120 |
| Air and gas rates: | | | | | | |
| Axial air, Mc.f.h. | [2] 4 | 75 | 75 | 75 | 75 | 75 |
| Tangential air Mc.f.h. | 250 | 75 | 75 | 75 | 75 | 75 |
| Axial air, percent of total air | 1.6 | 50 | 50 | 50 | 50 | 50 |
| Axial gas, Mc.f.h. | 0 | 3.0 | 3.0 | 3.0 | 3.0 | 3.0 |
| Tangential gas, Mc.f.h. | 16.7 | 5.0 | 5.0 | 5.0 | 5.0 | 5.0 |
| Total air/oil ratio, c.f./gal | 1,021 | 888 | 888 | 888 | 888 | 888 |
| Carbon black product: | | | | | | |
| Yield, lbs./gal | 3.05 | 3.25 | 2.86 | 2.86 | 2.84 | 2.74 |
| Photelometer | 90 | 91 | 92 | 91 | 96 | 93 |
| N₂ surface area, sq. m./g | 126.0 | 106.8 | 110.0 | 110.6 | 117.5 | 126.1 |
| Oil absorption, cc./g | 1.38 | 1.55 | 1.69 | 1.74 | 1.78 | 1.85 |

[1] Measured from upstream entrance to second combustion zone 11.
[2] Jacket air.

Samples of the carbon black products from runs 1 and 5 were compounded with a natural rubber to produce a series of rubber compositions. The following receipe employed in preparing said rubber composition was as follows:

| Components: | Parts by weight |
|---|---|
| Liberian crepe | 100 |
| Carbon black | 50 |
| Zinc oxide | 5 |
| Altax [1] | 0.06 |
| Sulfur | 2.5 |
| Stearic acid | 3.0 |

Benzothiazyl disulfide.

Said rubber compositions were each cured to a finished rubber by curing at 293° F. for thirty minutes. The resulting cured rubber compositions were tested in accordance with standard rubber testing procedures. The results of these tests are set forth below:

| Evaluation of carbon black in natural rubber | Run 1 | Run 5 |
|---|---|---|
| 300% modulus, p.s.i. | 2,240 | 2,590 |
| Tensile, p.s.i. | 3,400 | 2,640 |
| Elongation, percent | 430 | 320 |

From an examination of these tests, it will be noted that the 300% modulus value for the rubber containing the carbon black from run 5 was 350 pounds higher than the value from the rubber containing the carbon black from run 1, thus checking the increase to structural characteristics as shown by the increase of oil absorption values in Table II.

I claim:

1. In a apparatus for producing carbon black comprising in combination a first cylindrical chamber; a second cylindrical chamber having a diameter greater than the diameter of the first cylindrical chamber, the upstream end of said second cylindrical chamber being in axial alignment and connected to the downstream end of said first cylindrical chamber; at least one inlet means communicating with said second cylindrical chamber; a third cylindrical chamber having a diameter less than the diameter of the second cylindrical chamber, the upstream end of said third cylindrical chamber being in axial alignment and connected to the downstream end of said second cylindrical chamber, the improvement comprising removable annular plug means positioned within said first cylindrical chamber in contacting relationship to the inner wall of said chamber and extending substantially along its length, and adapted to form an annular constriction adjacent the outlet end thereof; and conduit means movably positionable along the length of said annular plug means to introduce feedstock through the opening of said annular constriction axially into said second cylindrical chamber.

2. Apparatus of claim 1 wherein said annular plug comprises a multisectional ceramic plug.

3. Apparatus of claim 2 wherein said elongated annular plug comprises at least two segments adapted to fit in an interlocking relationship when positioned in said first cylindrical chamber.

4. Apparatus of claim 2 wherein said means to introduce feedstock comprises a conduit having an inlet end and an outlet end, said conduit being adapted to extend through said first cylindrical chamber so that said outlet end is positioned adjacent the downstream end thereof.

5. The apparatus of claim 4 wherein said cylindrical annular plug comprises three 120° semi-circular segments.

6. A method of converting a carbon black furnace having an internal configuration comprising first, second and third axially aligned cylindrical reaction zones to a carbon black furnace having an internal configuration comprising said second and third reaction zones comprising:

(a) inserting within said first cylindrical reaction chamber an annular plug adapted to occupy substantially the length of said first cylindrical reaction chamber;

(b) positioning said annular plug so that the outlet portion of said first cylindrical reaction chamber is constricted; and (c) inserting a movably positionable carbon black feedstock introduction conduit through the resulting constriction so that the outlet of said conduit communicates with said second cylindrical reaction zone.

References Cited

UNITED STATES PATENTS

| | | | |
|---|---|---|---|
| 2,375,798 | 5/1945 | Krejci | 23—259.5 X |
| 3,013,865 | 12/1961 | Webster et al. | 23—259.5 |
| 3,079,236 | 2/1963 | Heller et al. | 23—259.5 X |
| 3,283,028 | 11/1966 | Bergstrom et al. | 23—259.5 X |
| 3,355,247 | 11/1967 | Krejci et al. | 23—259.5 X |
| 3,376,111 | 4/1968 | Stegelman | 23—259.5 X |

MORRIS O. WOLK, Primary Examiner

D. G. CONLIN, Assistant Examiner

U.S. Cl. X.R.

23—209.4, 209.6; 264—30